US005906296A

United States Patent [19]
Martindale et al.

[11] Patent Number: 5,906,296
[45] Date of Patent: May 25, 1999

[54] CONDIMENT DISPENSING SYSTEM UTILIZING A DRAW-BACK VALVE

[75] Inventors: Richard A. Martindale; Antonio J. Jepson, both of Vacaville; Charles Bennett, Sacramento; Juha Salmela, Citrus Heights, all of Calif.

[73] Assignee: Automatic Bar Controls, Inc., Vacaville, Calif.

[21] Appl. No.: 08/771,209

[22] Filed: Dec. 20, 1996

Related U.S. Application Data

[63] Continuation-in-part of application No. 08/630,828, Apr. 10, 1996.

[51] Int. Cl.$^6$ ...................................................... B67D 5/60
[52] U.S. Cl. .......................... 222/108; 222/132; 222/136
[58] Field of Search .............................. 222/105, 95, 108, 222/132, 135, 136, 144.5, 571

[56] References Cited

U.S. PATENT DOCUMENTS

| | | | |
|---|---|---|---|
| 3,170,597 | 2/1965 | Reichenberger | 222/36 |
| 3,227,325 | 1/1966 | Bates | 222/309 |
| 3,257,034 | 6/1966 | Dumm, III | 222/36 |
| 3,463,363 | 8/1969 | Zelna | 222/334 |
| 3,688,947 | 9/1972 | Reichenberger | 222/27 |
| 3,695,314 | 10/1972 | Watts et al. | 141/59 |
| 3,749,527 | 7/1973 | Slagle | 417/395 |
| 3,823,846 | 7/1974 | Probst | 222/70 |
| 3,830,405 | 8/1974 | Jaeger | 222/129.3 |
| 3,845,883 | 11/1974 | Johnson et al. | 222/30 |
| 3,897,887 | 8/1975 | Goldberg | 222/26 |
| 3,920,149 | 11/1975 | Fortino et al. | 222/1 |
| 3,979,023 | 9/1976 | Hartley | 222/61 |
| 3,993,218 | 11/1976 | Reichenberger | 222/30 |
| 4,034,757 | 7/1977 | Glover | 128/260 |
| 4,124,147 | 11/1978 | Priese et al. | 222/135 |
| 4,265,370 | 5/1981 | Reilly | 222/25 |
| 4,278,186 | 7/1981 | Williamson | 222/36 |
| 4,433,795 | 2/1984 | Maiefski et al. | 222/14 |
| 4,469,150 | 9/1984 | Grimaldi | 141/95 |
| 4,477,003 | 10/1984 | Baker et al. | 222/642 |
| 4,484,697 | 11/1984 | Fry, Jr. | 222/95 |
| 4,597,719 | 7/1986 | Tano | 222/571 |
| 4,619,378 | 10/1986 | de Man | 222/144.5 |
| 4,660,742 | 4/1987 | Ozdemir | 222/36 |
| 4,753,370 | 6/1988 | Rudick | 222/105 |
| 4,781,312 | 11/1988 | Strazdins | 222/309 |
| 4,863,066 | 9/1989 | Uffenheimer et al. | 222/1 |
| 4,930,555 | 6/1990 | Rudick | 141/98 |
| 5,044,521 | 9/1991 | Peckels | 222/23 |
| 5,127,547 | 7/1992 | Gerich | 222/55 |
| 5,158,210 | 10/1992 | Du | 222/134 |
| 5,230,443 | 7/1993 | Du | 222/134 |
| 5,255,819 | 10/1993 | Peckels | 222/1 |
| 5,318,197 | 6/1994 | Martindale et al. | 222/1 |
| 5,350,083 | 9/1994 | Du | 222/134 |
| 5,366,117 | 11/1994 | Mesenbring et al. | 222/132 |
| 5,368,195 | 11/1994 | Pleet et al. | 222/52 |
| 5,542,574 | 8/1996 | Stern | 222/137 |

FOREIGN PATENT DOCUMENTS

| | | |
|---|---|---|
| 25 48 442 | 5/1977 | Germany . |
| WO 94/08886 | 4/1994 | WIPO . |
| WO 94/08887 | 4/1994 | WIPO . |

OTHER PUBLICATIONS

Wunder–Bar Dispensing Systems—Wunder Bar Wine System General Specifications Bag–In–Box Type.

*Primary Examiner*—Philippe Derakshani
*Attorney, Agent, or Firm*—Townsend & Townsend & Crew LLP

[57] ABSTRACT

The invention relates to a condiment dispensing system for dispensing condiment and the like which includes a gas operated pump for moving condiment(s) from a condiment source to a delivery nozzle through a condiment conduit which includes a draw-back valve to prevent condiment buildup on the delivery nozzle. A gas-operated pump is controlled at the delivery nozzle to effect delivery of the condiment.

14 Claims, 5 Drawing Sheets

CONDIMENT DISPENSING SYSTEM UTILIZING A DRAW-BACK VALVE

This application is a continuation-in-part of application Ser. No. 08/630,828, filed Apr. 10, 1996, which is incorporated herein for all purposes.

BACKGROUND OF THE INVENTION

The invention relates to a system for dispensing condiments or the like. It is specially adapted to dispense condiments that contain solids or semi solids or particles such as is found in thousand island dressing and various "secret sauces" favored by restaurants without fouling the dispensing system. The invention provides for dispensing condiment rapidly and efficiently and uses a draw-back valve in the condiment dispensing conduit to prevent buildup of the condiment on the dispensing nozzle. The invention is particularly adapted to handle condiments that contain residual air or other gases without causing the condiment to splatter when delivered.

At present, condiment packers are unable to remove all air from the condiment during manufacturing or packing. Additionally, small $CO_2$ gas or atmosphere air leaks can cause the pump to suck air into the system, literally blending this air with the condiment. The air or gas can cause condiment to splatter at the nozzle when it exits under pressure and to drip and build up on the nozzle if not properly handled.

Typically, this air in prior art systems has been trapped within the condiment between pump condiment outlet and dispensing head on/off valve. When the condiment button is deactivated, the mechanical valve seals off the condiment conduit at the delivery nozzle, which, in turn, stops the condiment flow and thereby stops the pump. At the time of deactivation, pressure is trapped between pump outlet and the valve at the delivery nozzle. When the condiment button in the delivery nozzle is depressed again, and if an air pocket is within a few feet of the nozzle, the air bubble exits the delivery nozzle with sufficient velocity to cause "spitting" (splattering, spraying) within the immediate area. This can soil a customer's clothes and is a problem for the equipment user.

Heretofore there have been many systems developed for dispensing condiments automatically and in controlled portions. For example, U.S. Pat. No. 5,366,117, issued to John M. Mesenbring et al., provides a condiment dispensing system. The Background section of that patent describes many of the prior art methods and systems for dispensing condiments and the problems associated therewith. The Mesenbring et al. patent provides a system for selectively dispensing condiments for items of food, including a plurality of condiment containers, a dispenser head having a plurality of input passages, an outlet nozzle, and valves for controlling fluid flow from each of the input passages to the outlet nozzle, a plurality of fluid flow lines, with a line connecting each condiment container to a corresponding dispenser head input passage, and a fluid pump in each of the fluid flow lines whereby an operator can dispense selected condiments in controlled portions if desired from the nozzle onto a food item. Arrangements for daily and biweekly sanitizing of the system are also provided. The patent provides for the use of a dispensing head having a plurality of input passages which can be fouled during delivery of viscous condiments particularly by condiments that contain solid or semi solid particles.

Another approach to dispensing condiments is disclosed in U.S. Pat. No. 5,158,210 to Benjamin R. Du. The Background section of the Du patent also discusses prior art methods of dispensing condiments. The Du patent provides an improved condiment dispensing system for delivering a measured quantity of condiment as a constant flow rate. The device comprises a pump which is fluidly connected to a condiment source and a dispensing apparatus. The dispensing apparatus includes a valve assembly which is connected to both a pressurized fluid source and to the pump whereby actuation of a valve assembly contained on the surface of the dispensing apparatus causes a measured quantity of condiment to be dispensed from an outlet nozzle contained thereon. The pump of the Du patent is provided with two cavities which in operation alternately withdraw a predetermined quantity of condiment from a condiment source and dispense the predetermined quantity of condiment at a desired location.

There is still need for a condiment dispensing system which can handle condiments including viscous condiments and/or condiments with solid or semi solid particles in an efficient manner without fouling and which may contain air or other gases without splatter at the delivery nozzle and which act to prevent condiment buildup on the dispensing nozzle.

SUMMARY OF THE INVENTION

This invention provides a condiment dispensing system which includes a rack for holding a source of condiment. The source of condiment is preferably a condiment containing collapsible bag having an outlet port. A gas driven pump is provided and has a condiment inlet and a condiment outlet and a gas inlet for operating the pump. Conduit means connect the outlet port of the source of condiment with the condiment inlet of the pump. A source of gas such as $CO_2$ or air under pressure is used in the system to power the pump. A gas conduit connects the source of gas with the gas inlet of the pump through a delivery nozzle that has control valves to control the flow of gas to one or more pumps. In one embodiment, the delivery nozzle, having no valves on the condiment dispensing conduit, is used to dispense the condiment. In the preferred form, a draw-back valve is connected into the condiment dispensing conduit. A delivery conduit connects the delivery nozzle with the condiment outlet of the pump. The gas control valves on the delivery nozzle are used to flow gas to a selected pump to deliver condiment through the delivery conduit. Thus, the present invention provides a condiment dispensing system including a rack for holding one or more sources of condiment. The condiment source is preferably a bag-type container having an outlet port. A gas driven pump is provided and has a condiment inlet and a condiment outlet. The pump has a gas inlet for operating the pump. A conduit connects the outlet port of the source of condiment with the condiment inlet of the pump. A source of gas under pressure is provided as well as a delivery nozzle having at least one gas inlet and at least one gas outlet. A valve means is operatively positioned in the delivery nozzle for controlling gas flow therethrough. The delivery nozzle has at least one passageway for flowing condiment therethrough. A first gas conduit connects the source of gas with the gas inlet of the nozzle and a second gas conduit connects the gas outlet of the delivery nozzle with the gas inlet of the pump. A delivery conduit connects the passageway of the delivery nozzle with the condiment outlet of the pump. In the preferred form, a draw-back valve is connected into the delivery conduit for controlling flow of condiment therethrough and for preventing condiment buildup at the delivery nozzle.

OBJECTS OF THE INVENTION

It is a particular object of the present invention to provide an improved system for dispensing condiment or the like which system can handle viscous condiments and condiments containing solid or semi solid particulate matter or air or other gases without jamming and with positive flow control and with no splatter when the condiment is delivered. It is an additional object of the present invention to provide a draw-back valve on the condiment delivery conduit to prevent condiment buildup on the delivery nozzle. Other objects and advantages of the present invention will be apparent from the following detailed description read in view of the accompanying drawings which are made a part of this specification.

DETAILED DESCRIPTION OF THE INVENTION

Figure 1:
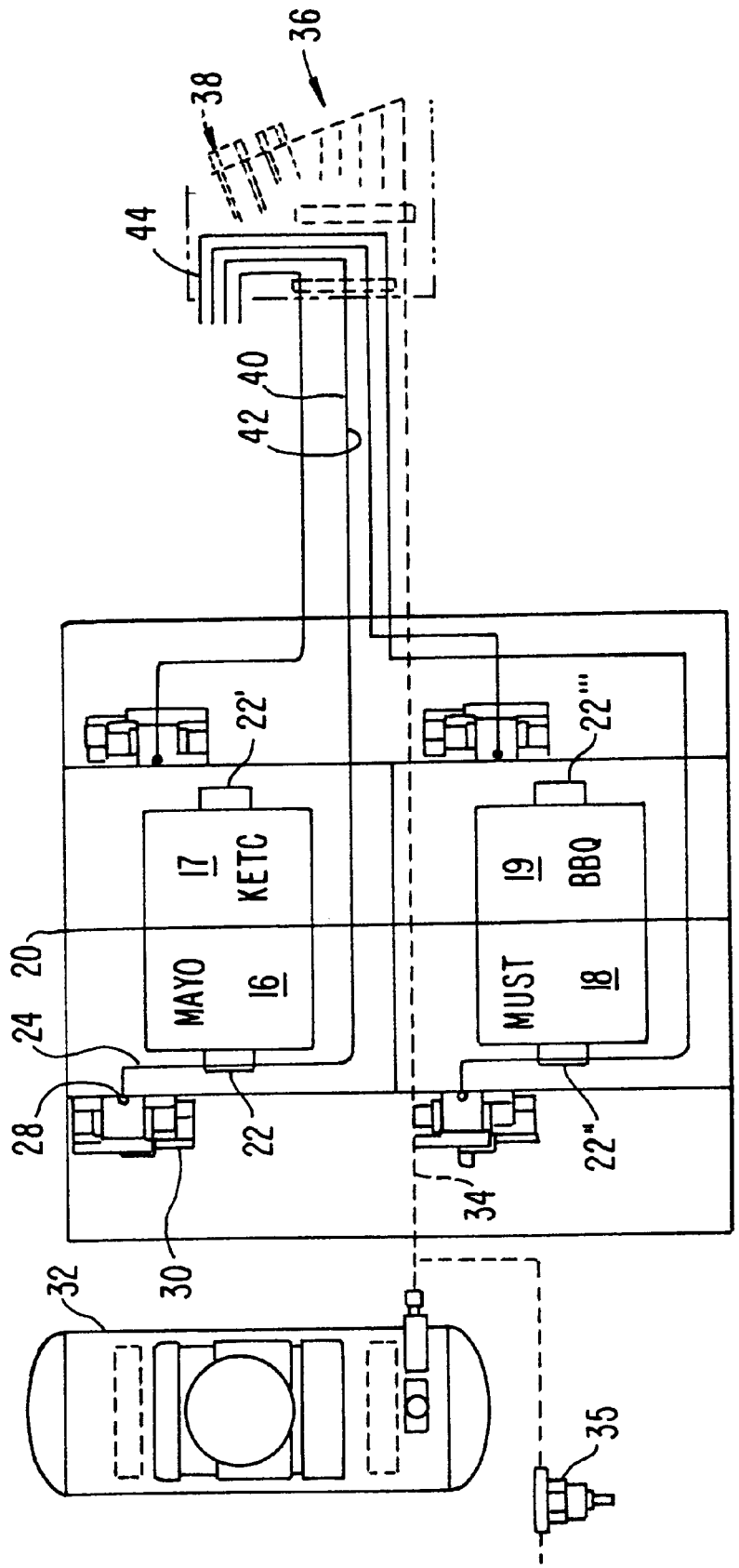
FIG. 1 is a schematic diagram illustrating one system for dispensing condiment and shows an embodiment of apparatus assembled in accordance with the present invention.

A system for dispensing condiment or the like is illustrated schematically in FIG. 1. The condiment dispensing system of FIG. 1 provides for handling condiments in a manner to prevent fouling of the system and splatter, particularly at the delivery nozzle. This is true, particularly when the condiment contains solid or semi-solid particles or air or other gases such as is found in thousand island dressing or various "secret sauces" found in many restaurants.

As noted, condiment packers are unable to remove all air from the condiment during manufacturing or packing. Additionally, small $CO_2$ gas or atmosphere air leaks can cause the pump to suck air into the system, literally blending this air with the product. This air can cause condiment to splatter at the nozzle when it exits under pressure. The valveless design of the present invention that switches gas on or off to the pump (rather than stopping flow of condiment in the condiment conduit) as a means of controlling the pump resolves this problem. An in-line on/off valve on the condiment conduit not being necessary, condiment is at zero pressure upon deactivation of the pump. Therefore, when condiment button at the delivery nozzle is once again depressed to start the pump, there is no pressure in the condiment conduit to cause the air to exit the delivery nozzle at a sudden rapid velocity. Therefore, spitting, splattering, and the subsequent mess associated with the resultant condiment spray is eliminated. The system for accomplishing this is described herein.

Referring now specifically to FIG. 1, a rack 20 for holding a source of condiment is shown. As is well known, condiment is commercially available in convenient condiment bags. The embodiment of FIG. 1 shows four bags 16–19 which might be, for example, mayonnaise, ketchup, mustard and barbecue sauce. The bags are made to be hung on a rack or to be otherwise supported at a desired location and the condiment withdrawn for use. Thus rack 20 may be in a form suitable for hanging a condiment bag. Alternatively, rack 20 may be formed in the shape of a cradle for supporting the condiment bag. In any event, the bags are formed with a condiment outlet 22, 22', 22", 22'". For simplicity's sake, the following discussion is directed to condiment bag 16 having condiment outlet 22. The outlet 22 is connected to a conduit 24. Conduit 24 provides a flow path from the condiment bag to the suction or inlet side 28 of a condiment pump 30.

The condiment pump 30 is preferably a dual diaphragm type pump. There are commercially available pumps that are useful in the present invention. One such pump for example is Model No. "Smooth" 166-200-11 by Shurflow of Santa Ana, Calif. 92706. However, any suitable type pump may be used. The pump is preferably gas driven. A source of gas, for example $CO_2$ or air source 32, is operatively connected by gas conduit 34 to the operating handle or tower indicated by the number 36 through a valve 38 and then to pump 30 by gas conduit 40. A pressure regulator 35 may be used to control pressure in conduit 34. The valve 38 is normally closed, and no gas flows to the pump 30. When valve 38 is opened, the pump 30 will be activated by gas flowing through the above-described gas conduits 34, 40.

A condiment conduit 42 is directly connected between the outlet of the pump 30 and the operating handle or tower 36. There are no valves on the condiment conduit 42 or in the condiment flow channel of the operating handle or tower 36 in this embodiment. Thus, the condiment delivery conduit is free flowing. When valve 38 in the operating handle or tower 36 is opened to permit gas flow to the pump 30, the pump 30 moves condiment to the operating handle or tower 36 for dispensation out nozzle 44.

Figure 2:
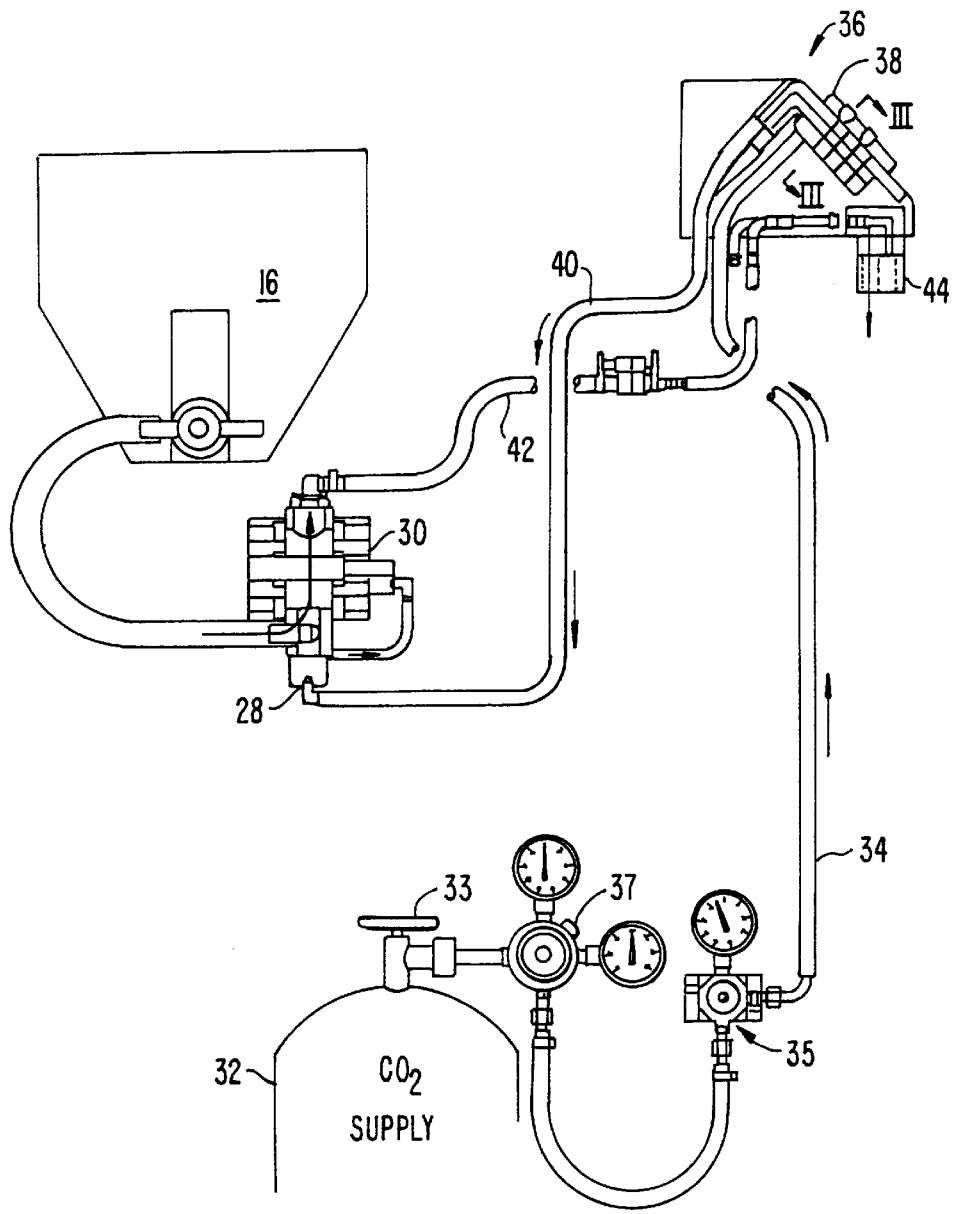
FIG. 2 is an enlarged schematic diagram and shows in more detail portions of the system of FIG. 1 for dispensing condiment.
Figure 3:
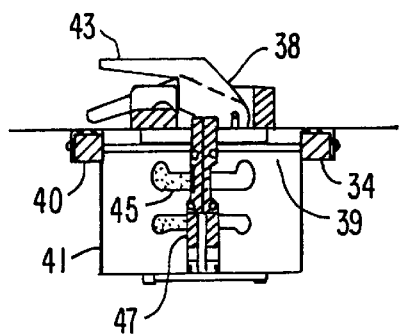
FIG. 3 is a sectional view taken at line III—III of FIG. 2.

FIG. 2 is an enlarged schematic diagram of a portion of the dispensing system shown in FIG. 1. Parts in FIG. 2 that are also shown in FIG. 1 will be given the same number. Thus, a source of gas 32 is connected through valve 33, meter 37 and pressure regulator 35 by means of conduit 34 to the operating handle or tower 36. The conduit 34 is connected into valve 38. Valve 38 is normally closed to prevent gas flow therethrough. FIG. 3 is an enlarged sectional view taken at III—III of FIG. 2 and shows valve 38 in more detail as will be described below. Conduit 40 is connected downstream of valve 38 and extends to the pump 30 where it is operably connected to the suction side 28 of the pump. A condiment conduit 42 is connected between the outlet of the pump 30 and the delivery nozzle 44 in the operating handle tower 36. When valve 38 is opened, the pump is activated by the gas flowing through the gas conduits 34, 40. The pump 30 draws condiment from the bag in the box source 16 which flows through the condiment conduit through the flow control 41 and then out nozzle 44. Flow control 41 is a control with an adjustable orifice for use in controlling flow of condiments of different viscosities. There are no operating valves on the condiment conduit 42 in this embodiment.

Valve 38 shown in FIG. 3 is connected at the delivery nozzle 44 on a suitable tower 36 for controlling the flow of gas from the gas source 32 through conduit 34 then through the opening 39 in the valve body 41 when the valve lever 43 is depressed as shown in phantom in FIG. 3 to depress valve stem 45 to align the openings. A spring 47 is used to return the valve to a closed position when pressure on lever 43 is released. The invention is illustrated with a tower to hold the delivery nozzle 44. As is well known in the art, the delivery nozzle may also be utilized in a hand-held dispenser.

Figure 4:
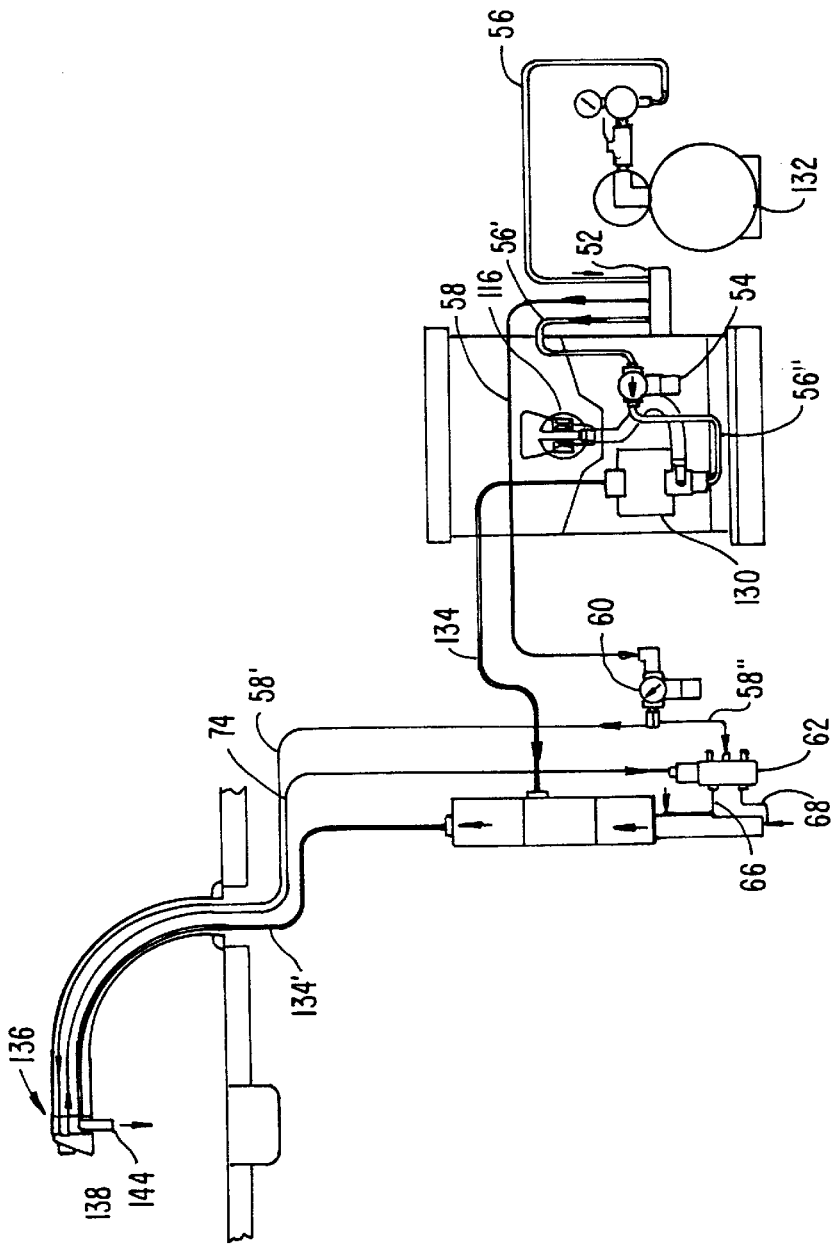
FIG. 4 is a schematic diagram illustrating the preferred system for dispensing condiment and shows an embodiment of apparatus including a draw-back valve on the condiment dispensing conduit useful to prevent condiment buildup on the nozzle.
Figure 4A:
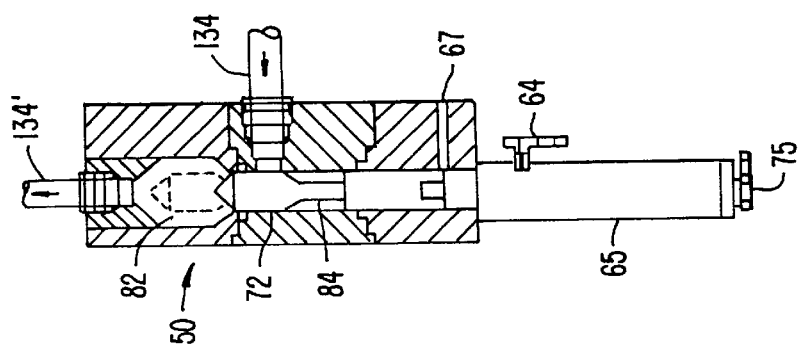
FIG. 4a is an expanded view partially in section of the draw-back valve of the apparatus of the present invention.

Refer now to FIGS. 4 and 4a where the preferred embodiment of the present invention utilizing a draw-back valve in the condiment dispensing conduit is shown. This embodiment is similar to the embodiment of FIGS. 1–3 but is provided with the draw-back valve generally indicated by the numeral 50 on the condiment delivery conduit. The draw-back valve 50 is connected into the condiment dispensing conduit 134, 134' between the outlet of the outlet of the condiment pump 130 and the operating handle or tower indicated generally by the numeral 136.

A source of gas, such as, for example, air compressor 132, is provided and is connected through an air distribution device 52 and an air pressure regulator 54 to the inlet of condiment pump 130. A source of condiment, indicated as 116, is connected by an appropriate conduit to pump 130. When the system is activated by pushing the button of push-button valve 138, the pump will act to deliver condiment through conduit 134, draw-back valve 50 and conduit 134' for delivery out of nozzle 144.

During periods when the apparatus is not dispensing condiment, i.e., the button of the push-button valve 138 is not depressed, positive air pressure is maintained to the upside of pump 130 from compressor 132 through conduit 56, air pressure regulator 54 and conduit 56'. Positive air pressure is also maintained to the push-button valve 138 through conduit 58, air control regulator 60 and conduit 58' to the upstream portion of push-button valve 138. Positive air pressure is also maintained in conduit 58" to air control valve 62. The air control valve is connected to the upper inlet 64 (FIG. 4a) of the piston housing section 65 of the draw-back valve 50 by means of conduit 66 and to the lower inlet 75 by means of conduit 68. When the system is not in operation, i.e., push-button valve 138 is closed, the air-control valve 62 provides positive air pressure in conduit 66 to inlet 64 to act on the piston in piston section 65 to hold the valve stem 72 in the closed position as illustrated by solid lines in FIG. 4a.

Air conduit 74 is connected from the downstream portion of push-button valve 138 to the air control valve 62. When the push-button valve 138 is opened, i.e., by depressing the button, air flow in conduit 74 raises the pressure therein and causes the air control valve to switch air flow to conduit 68 and inlet 75 of the piston housing section 65 of the draw-back valve 50 causing the valve stem 72 to move to the position shown by phantom lines in FIG. 4a. In this position, the reduced diameter portion 84 of the valve stem moves into the vacuum chamber 82 of the valve housing and opens conduits 134, 134' for flow of condiment to the dispensing nozzle 144 by means of pump 130 which, as noted, always has air operating pressure through conduit 56', air pressure regulator 54, and conduit 56".

When the push-button valve 138 is closed, i.e., pressure on the button is released, air to conduit 74 is cut off and air pressure is developed in conduit 58' causing air control valve to again direct air flow through conduit 66 into port 64 of piston section 65 to move valve stem 72 back to close the condiment dispensing valve as shown in solid lines in FIG. 4a. This movement of the valve stem draws a vacuum in the valve chamber and thus draws back condiment from conduit 134' and prevents drip at nozzle 144.

Figures 5, 6:
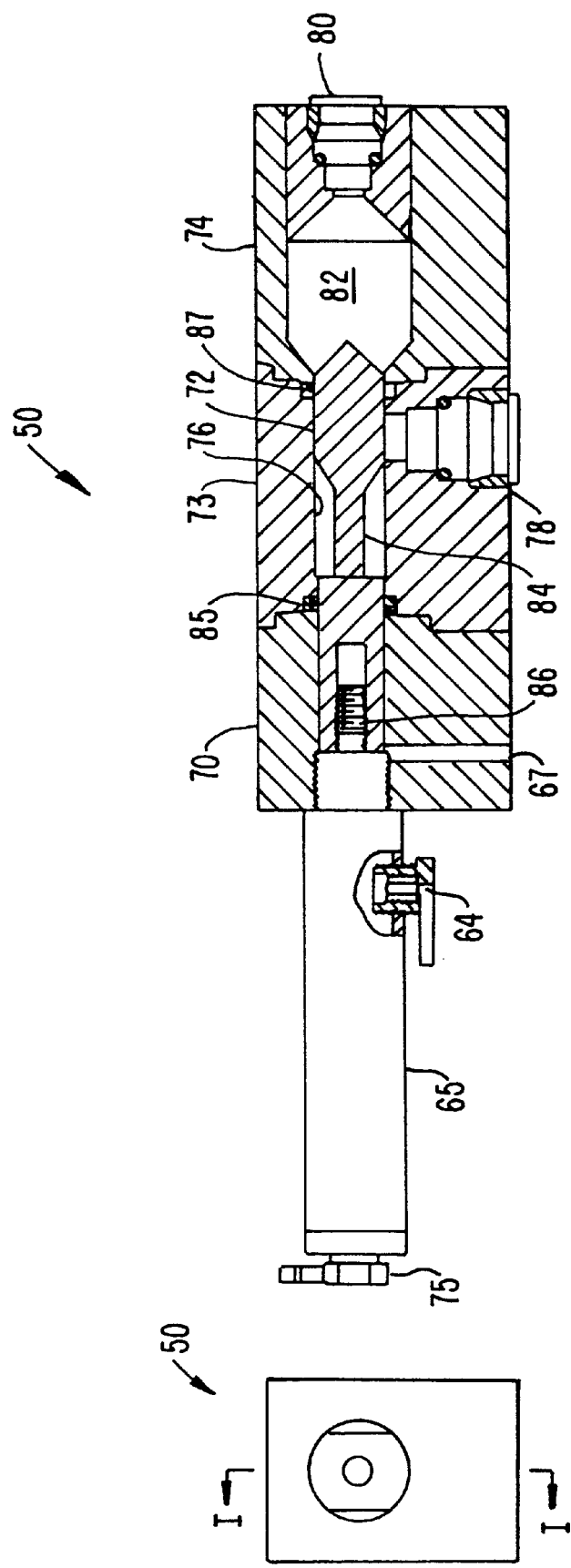
FIG. 5 is an end view of the draw-back valve of the apparatus of the present invention.
FIG. 6 is an elevation view partially in section taken at I—I of FIG. 5.

FIGS. 5 and 6 show the preferred draw-back valve 50 of the present invention. FIG. 5 is an end view of the draw-back valve, and FIG. 6 is a front view partially in section of the draw-back valve of FIG. 5. A draw-back valve housing made up of members 70, 73, 74 having a central opening 76 therethrough is provided. An entry port 78 for condiment and an exit port 80 for condiment are provided in the valve housing and communicate with the central opening 76. These ports are operatively connected to condiment conduit 134 and condiment conduit 134', respectively. The upstream portion of the valve housing has a vacuum chamber 82 formed therein between the entry port 78 and the exit port 80. A valve stem 72 is slidably positioned in the central opening 76. The valve stem comprises an enlarged portion on its forward end and a reduced diameter portion 84 at its rearward end. The valve stem is connected to a piston member 86 which is slidably positioned in piston housing 65. Thus, the valve stem 72 may be moved up and back within the central opening 76 of the valve housing.

The piston housing 65 is provided with lower gas inlet 75 and upper gas inlet 64. A piston (shown in FIG. 7) is provided between the inlets and is connected to the reduced diameter portion 84 of the valve stem 72 to move the valve stem between a closed position as shown in FIG. 6 and an open position as shown in phantom in FIG. 4a and FIG. 6. In the closed position the draw-back valve prevents flow of condiment to the delivery nozzle 144, and in the open position allows flow of condiment to the delivery nozzle 144.

When push-button valve 138 is opened and the valve stem is moved forward to the position indicated in phantom in FIG. 4a, condiment will flow through the draw-back valve 50 past the reduced diameter portion 84 of the valve stem 72. The valve stem moves through O-ring 87 in a fluid-tight manner. A second O-ring 85 is also provided in the valve housing to seal off the valve stem. When the push-button valve is closed, the valve stem is moved back to the position shown in FIG. 6, and a vacuum is drawn in vacuum chamber 82 which results in a sucking action in condiment conduit 134' to draw back condiment in that conduit into the vacuum chamber 82 and thus prevent leaking or buildup of condiment at dispensing nozzle 144. The vacuum chamber 82 and the valve stem 72 may be advantageously sized to clear conduit 134' of condiment to insure that no leakage or buildup will occur.

Figure 7:
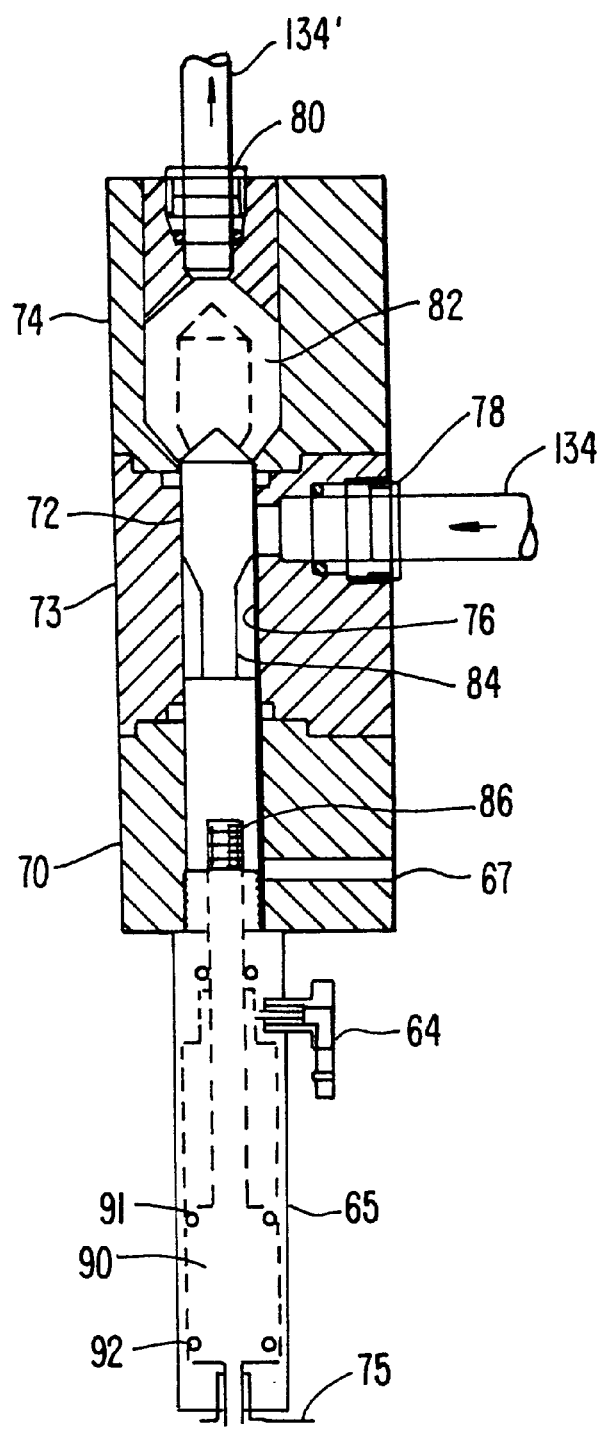
FIG. 7 is an elevated view partially in section and shows in more detail the draw-back valve of FIG. 6.

As shown in more detail in FIG. 7, located inside of the piston housing 65 is a syringe pump piston 90 which has O-rings 91 and 92 which seal the piston in an air-tight movable manner interiorly of piston housing 65. Thus, gas flow in the interior of the piston housing through the lower gas inlet 75 will move the pump piston and the valve stem 72 into the position shown in phantom in FIG. 7 and permit flow of condiment out of the dispensing nozzle as described above. Gas flow into gas inlet 64 and release of pressure below the pump piston at gas inlet 75 will move the valve stem back to close off flow of condiment and to provide a sucking action drawing back an equal volume of condiment into chamber 82. A relief port 67 is provided to permit any trapped gas behind the valve stem to escape from the draw-back valve. Since the chamber 82 is hydraulically locked to the dispensing nozzle 144, the resulting draw back will move condiment back into conduit 134' and leakage at the nozzle will not occur.

Thus, the present invention provides apparatus and method of dispensing condiment from a condiment source including the steps of providing a conduit from the condiment source to a delivery nozzle and providing a gas-operated pump operatively connected to the source of condiment. A pump is operatively connected to a source of gas through the delivery nozzle. A gas control valve is provided on the delivery nozzle to control gas flow to the pump whereby opening the gas control valve causes flow of gas to the pump causing condiment to flow out of the delivery nozzle without splatter. A draw-back valve is provided to prevent condiment buildup at the dispensing nozzle.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

What is claimed is:

1. A condiment dispensing system comprising a source of condiment; a gas driven pump for moving said condiment; a conduit connecting the source of condiment with said pump; a source of gas under pressure; a delivery nozzle having at least one gas inlet and at least one gas outlet, a valve in said delivery nozzle for controlling gas flow therethrough and at least one passageway for flowing condiment therethrough, first gas conduit means connecting said source of gas with the gas inlet of said nozzle, second gas conduit means connecting the gas outlet of said delivery nozzle with said pump; a delivery conduit connecting the pump to said delivery nozzle for delivering condiment to said delivery nozzle from said pump; and a draw-back valve operably connected on said delivery conduit, said draw-back valve being separate and spaced from said pump and comprising a housing having a condiment entry port coupled to said pump via a portion of said delivery conduit and a condiment exit port coupled to said delivery nozzle via another portion of said delivery conduit.

2. The system of claim 1 further characterized in that a plurality of pumps and sources of condiments are connected for flow through a plurality of condiment outlets in said delivery nozzle.

3. The system of claim 1 wherein said housing includes a housing interior and said draw-back valve comprises a valve stem disposed in said housing interior and movable between an open position and a closed position, said valve stem disposed away from said condiment entry port to permit condiment flow through said housing interior between said condiment entry port and said condiment exit port in said open position, said valve stem blocking said condiment entry port and drawing a vacuum in a portion of said housing interior between said condiment entry port and said condiment exit port when moved to said closed position.

4. The system of claim 3 wherein said valve stem comprises an enlarged portion and a reduced portion, said enlarged portion being moved adjacent to and blocking said condiment entry port in said closed position and being moved away from and unblocking said condiment entry port in said open position to permit condiment flow past said reduced portion through said housing interior to said condiment exit port.

5. The system of claim 3 wherein said housing interior comprises a central opening and said valve stem is movable back and forth in a generally linear manner within said central opening.

6. The system of claim 5 wherein said valve stem is connected to a piston which drives said valve stem to move within said central opening between said open position and said closed position.

7. The system of claim 6 wherein said piston is gas-driven to produce a delivery stroke to move said valve stem from said closed position to said open position and a suction stroke opposite in direction from said delivery stroke to move said valve stem from said open position to said closed position.

8. A condiment dispensing system comprising a rack for holding a source of condiment having an outlet port; a gas driven pump having a condiment inlet and a condiment outlet and a gas inlet for operating said pump; conduit means connecting the outlet port of the source of condiment with the condiment inlet of said pump; a source of gas under pressure; a delivery nozzle having at least one gas inlet and at least one gas outlet, a valve in said delivery nozzle for controlling gas flow therethrough and at least one passageway for flowing condiment therethrough, first gas conduit means connecting said source of gas with the gas inlet of said nozzle, second gas conduit means connecting the gas outlet of said delivery nozzle with the gas inlet of said pump; a delivery conduit connecting the passageway of said delivery nozzle with the condiment outlet of said pump; and a draw-back valve operably connected on said delivery conduit, said draw-back valve comprising a housing having a housing cavity, a condiment entry port for receiving condiment from a portion of said delivery conduit, and a condiment exit port for dispensing condiment to another portion of said delivery nozzle; a valve stem disposed in said housing cavity and movable between an open position and a closed position, said valve stem disposed away from said condiment entry port to permit condiment flow through said housing cavity between said condiment entry port and said condiment exit port in said open position, said valve stem blocking said condiment entry port and drawing a vacuum in a portion of said housing cavity between said condiment entry port and said condiment exit port when moved to said closed position.

9. The system of claim 8 wherein said valve stem is connected to a piston which drives said valve stem to move within said housing cavity between said open position and said closed position, the piston disposed and movable in an interior of a piston housing.

10. The system of claim 9 wherein said piston has a front portion facing said valve stem and a rear portion facing away from said valve stem, and the piston housing includes an upper gas inlet for flowing gas into a front region of said piston housing interior between the front portion of said piston and said valve stem and a lower gas inlet for flowing gas into a rear region of said piston housing interior behind said rear portion of said piston.

11. The system of claim 10 further comprising a gas control valve for controlling gas flow through said upper gas inlet and lower gas inlet to move said piston.

12. The system of claim 10 wherein said piston is sealed in an air-tight movable manner interiorly of said piston housing.

13. The system of claim 12 further comprising a first O-ring disposed adjacent said front portion of said piston and a second O-ring disposed adjacent said rear portion of said piston, said first and second O-rings movable with said piston and sealing said piston in an air-tight movable manner interiorly of said piston housing.

14. A method of dispensing condiment from a condiment source comprising the steps of providing a delivery conduit from said condiment source to an open delivery nozzle, providing a gas-operated pump operatively connected to said source of condiment; connecting said pump to a source of gas through said delivery nozzle, providing a gas control valve on said delivery nozzle to control gas flow to said pump whereby opening said gas control valve causes flow of gas to said pump causing condiment to flow through said delivery conduit and out of said delivery nozzle; and providing a draw-back valve on said delivery conduit, said draw-back valve operable by a piston stroke to simultaneously block flow of condiment into said drawback valve and produce a vacuum in said delivery conduit when said gas control valve is closed to stop gas flow to said pump, whereby condiment is sucked back from said delivery nozzle.

* * * * *